United States Patent [19]

Nobue et al.

[11] Patent Number: 4,802,012
[45] Date of Patent: Jan. 31, 1989

[54] IMAGE SENSOR DRIVING DEVICE WITH NOISE REDUCTION CIRCUITS

[75] Inventors: Mamoru Nobue; Takashi Ozawa; Hisao Ito; Yoshio Nishihara, all of Kanagawa, Japan

[73] Assignee: Fuji Xerox Co., Ltd., Tokyo, Japan

[21] Appl. No.: 76,599

[22] Filed: Jul. 22, 1987

[30] Foreign Application Priority Data

Jul. 22, 1986 [JP] Japan .................................. 61-172484

[51] Int. Cl.[4] .............................................. H04N 3/14
[52] U.S. Cl. ............................ 358/213.18; 358/213.15
[58] Field of Search ........................ 358/213.15, 213.17, 358/213.18

[56] References Cited

U.S. PATENT DOCUMENTS

| 4,336,557 | 6/1982 | Koch | 358/213.15 |
| 4,380,755 | 4/1983 | Endlicher et al. | 358/213.15 |
| 4,511,804 | 4/1985 | Ozawa | 358/213.15 |
| 4,578,707 | 3/1986 | Ozawa et al. | 358/213.15 |
| 4,634,886 | 1/1987 | Hatanaka et al. | 358/213.15 |

Primary Examiner—Jin F. Ng
Assistant Examiner—Stephen Brinich
Attorney, Agent, or Firm—Finnegan, Henderson, Farabow, Garrett, & Dunner

[57] ABSTRACT

Image signals of an original is obtained from a plurality of image sensors and are successively supplied to an output terminal. A switching element is provided for resetting the previous image signal, which adversely causes to produce noises. An image sensor driving device according to the invention is to cancel the noises by the provision of a noise accumulating circuit and a subtracting circuit for subtracting the noises as accumulated in the noise accumulating circuit from the image signal on which the noises are superimposed.

2 Claims, 4 Drawing Sheets

IMAGE SENSOR DRIVING DEVICE WITH NOISE REDUCTION CIRCUITS

BACKGROUND OF THE INVENTION

The present invention relates to an image sensor driving device, and more particularly to an image sensor driving device wherein an S/N ratio of an original information read out signal obtained from an image sensor is improved.

FIG. 1 is a circuit diagram illustrating a prior art image sensor driving device. In the figure, the driving device includes M blocks of photo-cell sections B(1) through B(M), in which each block has N pieces of photo-cells; switching elements 2(1) through 2(MN), each connected to one terminal of the associated photo-cell; N pieces of signal lines L(1) through L(N), each signal line connected to one of the switching elements in each block; and an analog multiplexer 10, the inputs of which are connected to signal lines L(1) through L(N). The other terminals of the respective MN pieces of the photo-cells are connected to a power supply VB through a common line CL. The switching elements are connected on a block basis to the respective common gate lines G1, G2, ---, G(M).

The analog multiplexer 10 include, as shown in FIG. 2, a group of reset switches 4(1) through 4(N), each being formed with an FET which is connected between each one of the associated signal lines L(1) through L(N) and ground; voltage follower type amplifiers 3(1) through 3(N) each having high input impedances; and a group of switches 5(1) through 5(N) connected respectively to the outputs of the amplifiers 3(1) through 3(N) and on-off controlled by outputs of a shift register 11.

In the image sensor driving device thus arranged, when light reflected from the original is irradiated onto the photo-cell sections B(1) through B(M), each photo-cell causes a capacitor connected in parallel thereto to discharge in accordance with the amount of light incident to the photo-cell and to convert the original information into an amount of electric charges being stored.

The reset switches 4(1) through 4(N) are turned ON at appropriate timings to reset the signal lines L(1) through L(N), and are then turned OFF. When the gate line G1 is supplied with a gate voltage, switching elements 2(1) through 2(N) turn ON so that voltage information corresponding to the storage of electric charges is conveyed to the signal lines L(1) through L(N). Thereafter, switches 5(1) through 5(N) of the analog multiplexer 10 are successively turned ON in response to the output of the shift register 11, thereby successively connecting the signal lines L(1) through L(N) to an output line OUTL. With this operation, the original information in the photo-cells 1 through N within the first block B(1) is amplified by the amplifiers 3(1) through 3(N) and is read out from the output line OUTL, respectively.

Following this read-out operation, the voltage applied to the gate line G1 is set to a low level. After the reset switches 4(1) through 4(N) are turned ON, the gate line G2 is supplied with the gate voltage. With such an operation, the switching elements 2(1) through 2(N) are rendered OFF whereas the elements 2(N+1) through 2(2N) are rendered ON. Hence, the original information sensed by the second block of the photo-cell section B(2) is transmitted to the signal lines L(1) through L(N). The original information covered by the second block B(2) is transmitted to the output line OUTL by the analog multiplexer 10.

With a repeat of the same operation, the original information for one line sensed by the photo-cells of the remaining blocks is successively read out to the output line OUTL.

The prior art driving device as described above has problems which will be described hereinafter.

In deriving the original information sensed by the photo-cell from the output line OUTL, the gates of the reset switches 4(1) through 4(N) are supplied with a reset signal to turn ON the reset switches 4(1) through 4(N). This is performed to remove residual information of the previous block from the signal lines L(1) through L(N) after reading the original information is one block but before reading the original information in the subsequent block.

However, ON/OFF operation of the reset switches 4(1) through 4(N) cause to produce noise. Due to the noise on the signal lines L(1) through L(N), an S/N ratio of the information is deteriorated.

In addition, despite the fact that an input signal level to the analog multiplexer 10 would be 1 through 100 mV and a gain of the individual amplifiers 3(1) through 3(N) would be 100 times, variation in offset of each amplifier is several tens mV. Further, the variation in the gain is in the range of approximately ±50% according to the variation in each value of resistors r1 through rn and R1 through Rn. This makes it difficult to obtain an excellent S/N ratio.

In addition, if the centuple (100 times) gain amplifier is replaced by cascade-connected two-stage amplifiers, each being decuple (10 times) gain, influence of the variation in the resistor values become small. Yet, it is still impossible to remove the offset of the amplifier and hence the problem can not be solved.

SUMMARY OF THE INVENTION

This invention has been achieved to solve the aforementioned problems.

In order to solve the problems mentioned above, this invention provides a device comprising a plurality of signal lines to which original information signals sensed by light receiving elements of an image sensor are supplied, noise reduction means connected to each of the signal lines, and means for cyclically taking out output signals of the noise reduction means. This device reduces the switching noises, the offset of the amplifiers or the like and improve the S/N ratio of the original information to thereby be read out.

DETAILED DESCRIPTION OF THE PREFERRED EMBODIMENTS

Figure 1:
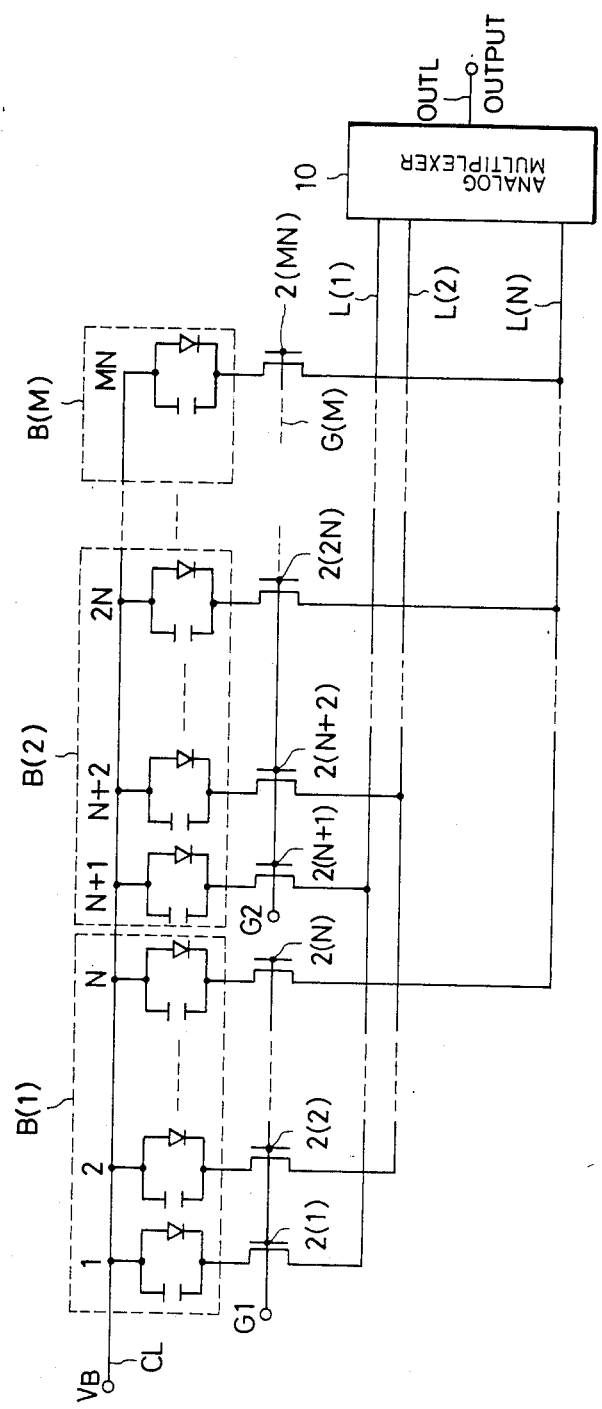
FIG. 1 is a block diagram showing a prior image sensor driving device.

Referring to the drawings, the present invention will be explained in detail hereinafter.

Figure 2:
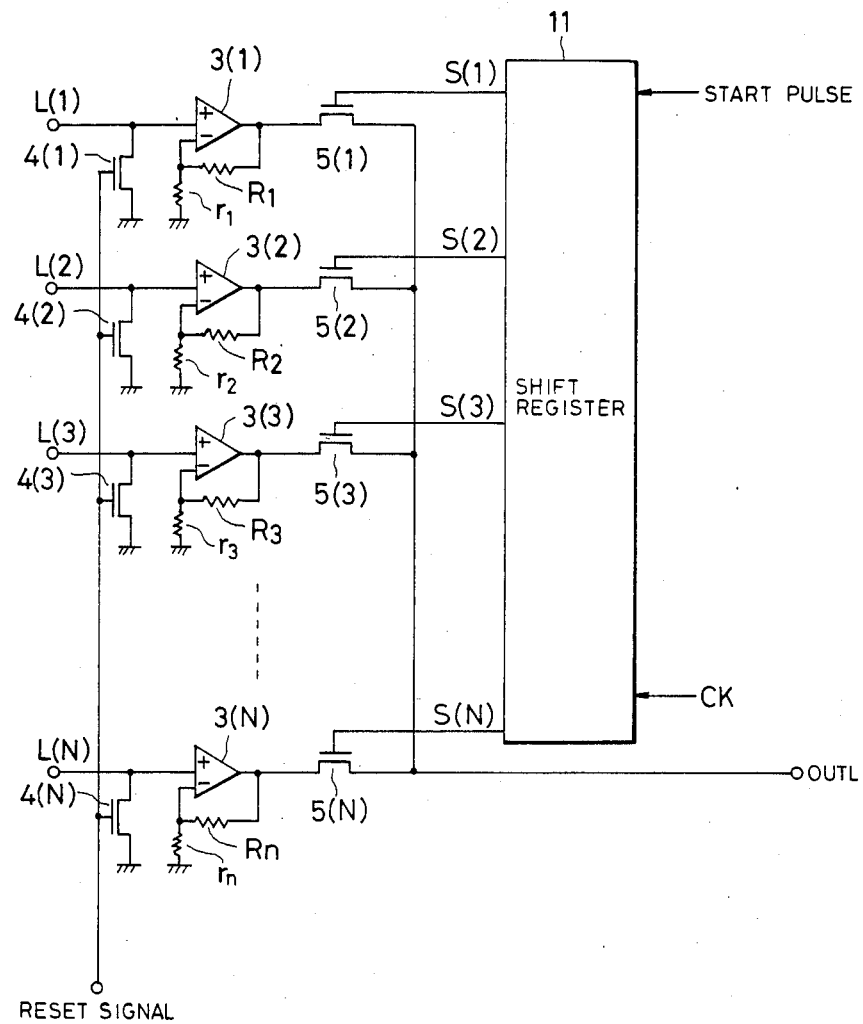
FIG. 2 is a circuit diagram showing one example of an analog multiplexer shown in FIG. 1.
Figure 3:
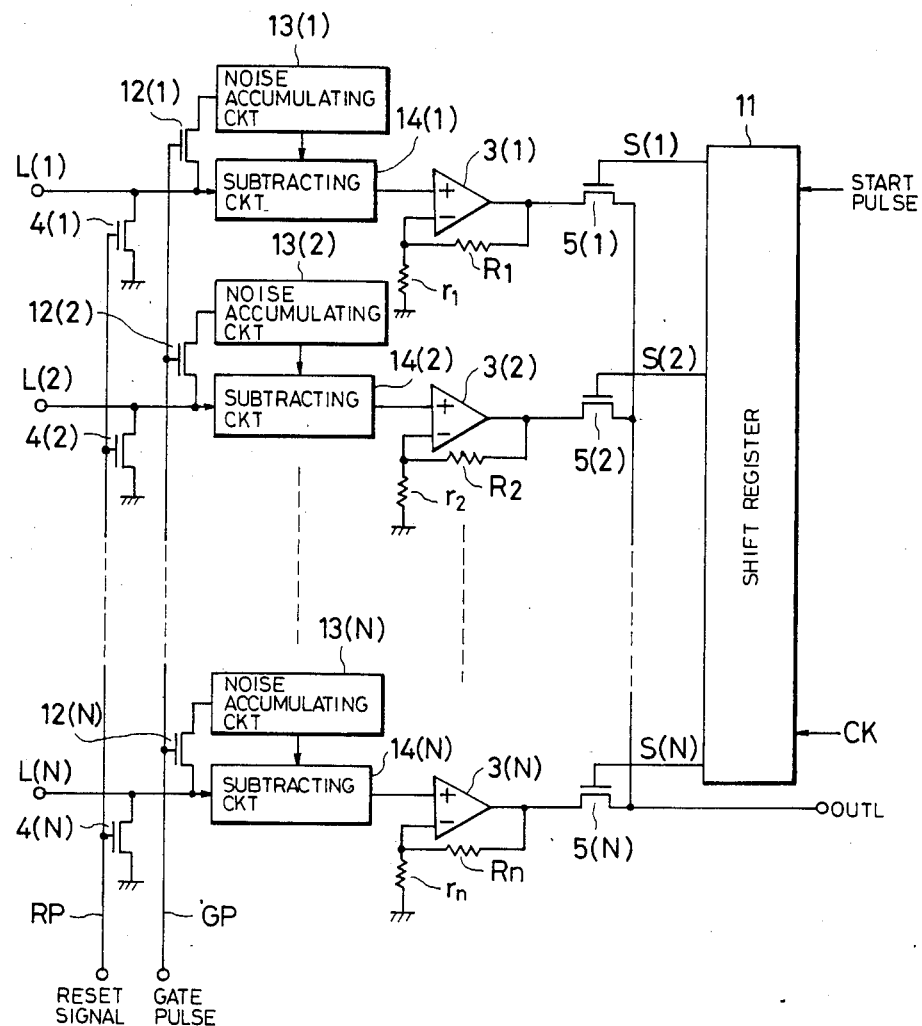
FIG. 3 is a circuit diagram showing a first embodiment of this invention.

FIG. 3 is a block diagram showing a first embodiment of this invention. In the figure, reference numerals 12(1), 12(2), ---, 12(N) designate first switches and numerals 13(1), 13(2), ---, 13(N) designate noise accumulating circuits, each connected to the corresponding first switch. Reference numerals 14(1), 14(2), ---, 14(N) designate subtracting circuits, each connected to the associated signal line L(1) through L(N). The subtracting circuit subtract noise signals held in the noise accumulating circuits 13(1) through 13(N) from the readout image signals supplied through the signal lines L(1) through L(N), respectively. Other reference numerals or characters designate the same or similar ones shown in FIG. 2.

Figure 4:
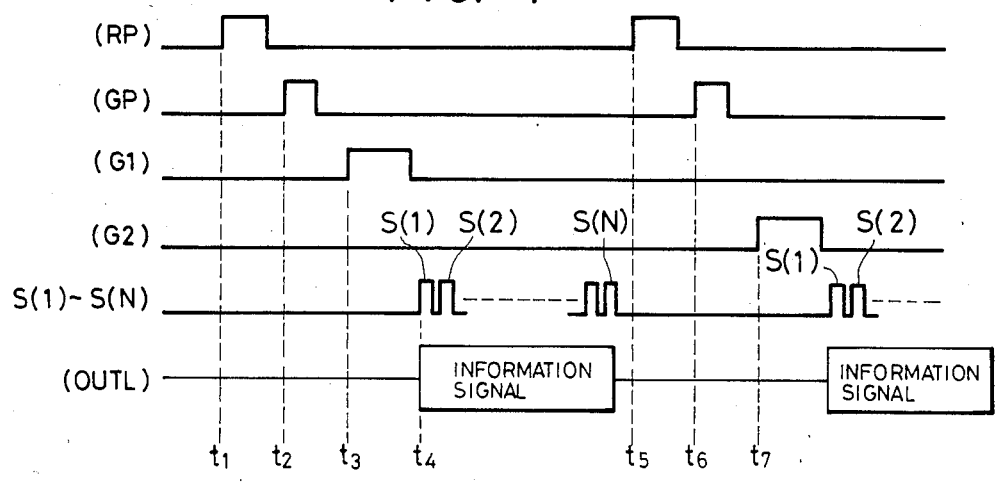
FIG. 4 is a timing chart showing the signals appearing in its principal parts.

The operation of this embodiment will be explained by referring to a timing chart of FIG. 4. Reference numerals or characters appearing in FIG. 4 are given so as to correspond to those in FIG. 3 and each numeral or character in FIG. 4 shows a waveform of the signal appearing at the portion indicated by the same numeral or character in FIG. 3.

First, a reset pulse RP is applied (time t1) and hence the reset switches 4(1) through 4(N) are turned ON. Consequently, electric signals remaining on the signal lines L(1) through L(N) are released to ground through the reset switches 4(1) through 4(N) so that the signal lines are all cleared. However, with the operation of the reset switches 4(1) through 4(N), noises are caused by those switches and then impressed on the signal lines L(1) through L(N). By applying a gate pulse GP to the first switches 12(1) through 12(N) connected to the respective signal lines L(1) through L(N) (time t2), the first switches 12(1) through 12(N) are turned ON. Upon turning on the first switches, the noises are held in the individual noise accumulating circuits 13(1) through 13(N).

Then, as the gate line G1 (See FIG. 1) of the image sensor is supplied with the gate voltage (time t3), the image signals are transferred from the photo-cells in the first block B(1) to the signal lines L(1) through L(N). These image signals are inputted to the respective subtracting circuits 14(1) through 14(N) after being superimposed upon the noises caused on the signal lines L(1) through L(N). The subtracting circuits 14(1) through 14(N) subtract the noises accumulated in the noise accumulating circuits 13(1) through 13(N) from the input signals and then apply the subtracted signals to the associated amplifiers 3(1) through 3(N). As a result, each input signal to the amplifiers 3(1) through 3(N) is made up only with the original information signal containing no noises.

Upon supplying selection signals S(1) through S(N) from the shift register 11 to switches 5(1) through 5(N) successively, the switches 5(1) through 5(N) are turned ON one after another so that the original information signals amplified by the amplifiers 3(1) through 3(N) are sent to the output line OUTL in order. After completion of reading out of the original information signals sensed by the photo-cells belonging to the first block (B1) of the image sensor, the reset pulse RP is impressed on the reset switches 4(1) through 4(N) in the same manner as described above (time t5). Accordingly, the original information signals remaining on the signal lines L(1) through L(N) are released to ground and then the gate pulse GP is impressed upon the first switches 12(1) through 12(N) (time t6) so that the noises are accumulated in the noise accumulating circuits 13(1) through 13(N). After that, when the gate voltage G2 is applied to the gate line G2 of the image sensor (time t7), the original information signals sensed by the photo-cells belonging to the second block B(2) are transmitted to the signal lines L(1) through L(N).

Although these original information signals together with the noises are inputted to the subtracting circuits 14(1) through 14(N), the noises are cancelled by the output from the noise accumulating circuits 13(1) through 13(N). As a result, the original information signals containing no noises are applied to the amplifiers 3(1) through 3(N). The switches 5(1) through 5(N) are successively turned O by the selection signals outputted from the shift register 11 and hence the original information signals amplified by the amplifiers 3(1) through 3(N) are sent to the output line OUTL one after another.

The same operation will be repeated.

As described above, according to this embodiment, the noises caused on the signal lines L(1) through L(N) at the time of switching the reset switches 4(1) through 4(N) can be removed so that it is capable of taking out the original information signals having a excellent S/N ratio.

In addition, the first embodiment provides an arrangement including the amplifiers 3(1) through 3(N) for amplifying the output signals from the subtracting circuits 14(1) through 14(N). However, such amplifiers are not always necessitated and may be omitted.

Figure 5:
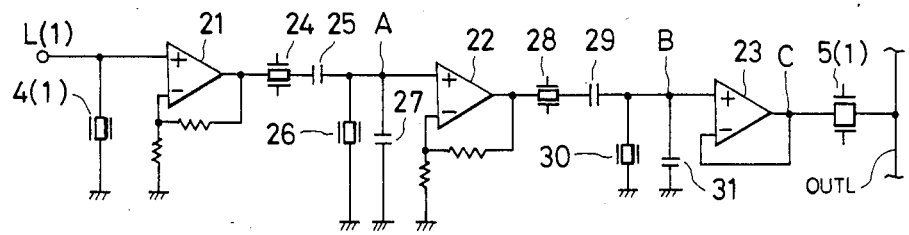
FIG. 5 is a circuit diagram showing a second embodiment of this invention.

A second embodiment of the present invention will next be explained with reference to FIG. 5. This embodiment provides an arrangement wherein the S/N ratio of the original information signals are improved by reducing the offsets of the amplifiers shown in FIG. 3. In FIG. 5, components which are the same as or similar to those shown in FIG. 3 are designated by the same reference numerals or characters. Also, since reduction of the offset in each amplifier is accomplished by the same manner, description will be provide with respect only to the amplifier 3(1).

The arrangement shown in FIG. 5 includes first and second amplifiers 21 and 22 each having a gain of, for example, 20 and a third amplifier having a gain of, for example, 1. An output terminal of the first amplifier 21 and a non-inverting input terminal of the second amplifier 22 are connected to each other through a series connection of a first analog switch 24 and a first capacitor 25. The non-inverting input terminal of the second amplifier 22 is connected to ground through a parallel connection of a second analog switch 26 and a second capacitor 27. The output terminal of the second amplifier 22 and a noninverting input terminal of a third amplifier 23 are, in the same manner as aforementioned, connected to each other through a series connection of a third analog switch 28 and a third capacitor 29. Also, the non-inverting input terminal of the third amplifier 23 is connected to ground through a parallel connection of a fourth analog switch 30 and a fourth capacitor 31.

Figure 6:
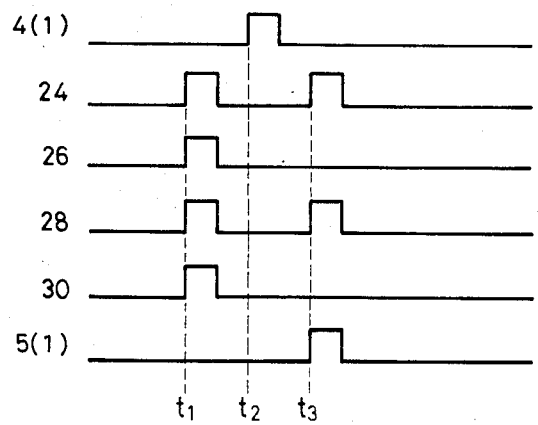
FIG. 6 is a timing chart showing signals appearing in its principal parts.

Referring to FIG. 6, an operation of this embodiment will be explained. FIG. 6 is a timing chart showing the switching timings of the analog switches. The signal line L(1) is supplied with the original information signal Vin read out from the photo-cell by impression of the gate voltage to the gate of the image sensor. After that, the first through fourth analog switches 24, 26, 28 and 30 are all turned O (time t1).

As a result, both the first capacitor 25 and the third capacitor 29 are charged so that the terminal voltages $V_{c25}$ and $V_{c29}$ of the capacitors 25 and 29, respectively, become as follows:

$$V_{c25} = 20 \text{ (Vin+Vos1)}$$

$$V_{c29} = 20 \text{ Vos2}$$

where Vos1 and Vos2 indicate offset voltages of the first and second amplifiers 21 and 22, respectively.

Next, the analog switches 24, 26, 28 and 30 are turned OFF and the switch 4(1) is turned ON so as to discharge electric charges accumulated on the signal line L(1) (time t2). Subsequently, the first and third analog switches 24 and 28 are turned ON (time t3). Then, the voltage VA at a point A is expressed as follows:

$$VA = (20Vos1 - V_{a25})/2 + Vos2$$
$$= -10 \text{ Vin} + Vos2$$

Also, the voltage VB at point B is expressed as follows:

$$VB = \{20 (-10 \text{ Vin} + Vos2) - V_{a25}\}/2 + Vos3$$
$$= -100 \text{ Vin} + Vos3$$

where, Vos3 indicates the offset voltage of the third amplifier 23.

Under this condition, the original information signal is taken out to the output line OUTL by turning the analog switch 5(1) ON. Then, the signal on the output line OUTL in the circuit of FIG. 5 becomes VC=100 Vin+Vos3. That is, the offset voltages Vos1 and Vos2 of the first and second amplifiers Vos1 and Vos2 are cancelled and only the offset voltage Vos3 appears on the output line OUTL, while the total gain of the whole circuit can be maintained at centuple (100 times).

As described above, according to the second embodiment of the invention, merely the third amplifier 23 having the gain of 1 (one) at the last stage causes the offset. Therefore, its offset value can be made extremely small. Furhter, since it may provide centuple (100 times) gain, a good result will be obtained when quantity of light irradiated on the original is small or when the device operates at a high speed.

Although the second embodiment provides the arrangement wherein the offset voltages resulting from the amplifiers are reduced, it would be apparent to one skilled in the art that a combination of the first and second embodiments will be capable of reducing the noises caused on the signal lines by the switching operation and also it will be possible to obtain such an image sensor driving device wherein the offset is reduced in the amplifiers.

As is apparent from the above description, this invention is advantageous in the following respects. First, switching noises caused on the signal lines can be removed or reduced and the original information signals having a good S/N ratio can be obtained. Second, the offset voltage in the amplifiers can be reduced and this also results in the improvement of the S/N ratio.

We claim:

1. An image sensor driving device comprising a plurality of signal lines, each of said plurality of signal lines being supplied with an image signal provided by a light receiving element of an image sensor; means for reducing noise superimposed on the image signal and appearing on each of said plurality of signal lines including a first amplifier connected to each of said plurality of signal lines; a second amplifier connected to said first amplifier through a first switch and a first capacitor; a third amplifier connected to said second amplifier through a second switch and a second capacitor; a third switch and a third capacitor connected in parallel between an input terminal of said second amplifier and ground; a fourth switch and a fourth capacitor connected in parallel between an input terminal of said third amplifier and ground, wherein gains of said first and second amplifier are made larger than a gain of said third amplifier and wherein said first through fourth switches are turned ON and are thereafter turned OFF and then said first and second switches are again turned ON; and means for deriving the image signal from an output of said noise reducing means.

2. An image sensor driving device as claimed in claim 1, wherein said noise reducing means comprises subtracting means connected to each of said plurality of signal lines, noise accumulating means connected to each of said plurality of signal lines, switch means connected between said noise accumulating means and each of said plurality of signal lines, and wherein said subtracting means cancels noises superimposed on the image signal by subtracting therefrom an output of said noise accumulating means.

* * * * *